United States Patent [19]

Haase

[11] 3,756,466
[45] Sept. 4, 1973

[54] PRESSURE WASH CONTROL SYSTEM
[75] Inventor: Robert L. Haase, Quakertown, Pa.
[73] Assignee: Aero Wash Systems, Inc., Quakertown, Pa.
[22] Filed: Nov. 19, 1970
[21] Appl. No.: 91,134

[52] U.S. Cl............... 222/63, 222/144.5, 222/318, 239/126
[51] Int. Cl............................................. B05b 9/00
[58] Field of Search.................. 222/63, 136, 144.5, 222/193, 318; 239/126, 127, 304, 305

[56] References Cited
UNITED STATES PATENTS
| 3,369,755 | 2/1968 | Roden et al. | 239/305 X |
| 3,383,044 | 5/1968 | Norstrud | 239/305 X |
| 3,454,030 | 7/1969 | Nelson | 239/305 X |
| 3,491,948 | 1/1970 | Alexander | 239/304 X |

Primary Examiner—Robert B. Reeves
Assistant Examiner—Frederick R. Handren
Attorney—Fleit, Gipple & Jacobson

[57] ABSTRACT

A pressure washer comprising a power driven pump having a fluid receiving inlet connected to a low pressure fluid directing means and a fluid discharge outlet connected to high pressure fluid discharge means. The low pressure fluid discharge means comprises conduit means and has a regulator mounted thereto which serves to regulate fluid pressure passing through the conduit means. Control means and a chemical injector means are also mounted to the conduit means. The high pressure fluid discharge means comprises a second conduit means; a bypass valve fixture mounted to the second conduit means and a bypass conduit secured to the bypass valve fixture with its other end secured to the first conduit means to allow fluid from the second conduit means to flow into the first conduit means for recirculation when the fluid is at a predetermined pressure. Discharge means is connected to the second conduit means to allow for a washer spray discharge.

4 Claims, 5 Drawing Figures

PATENTED SEP 4 1973

INVENTOR
ROBERT L. HAASE

BY Fleit, Gipple & Jacobson
ATTORNEYS

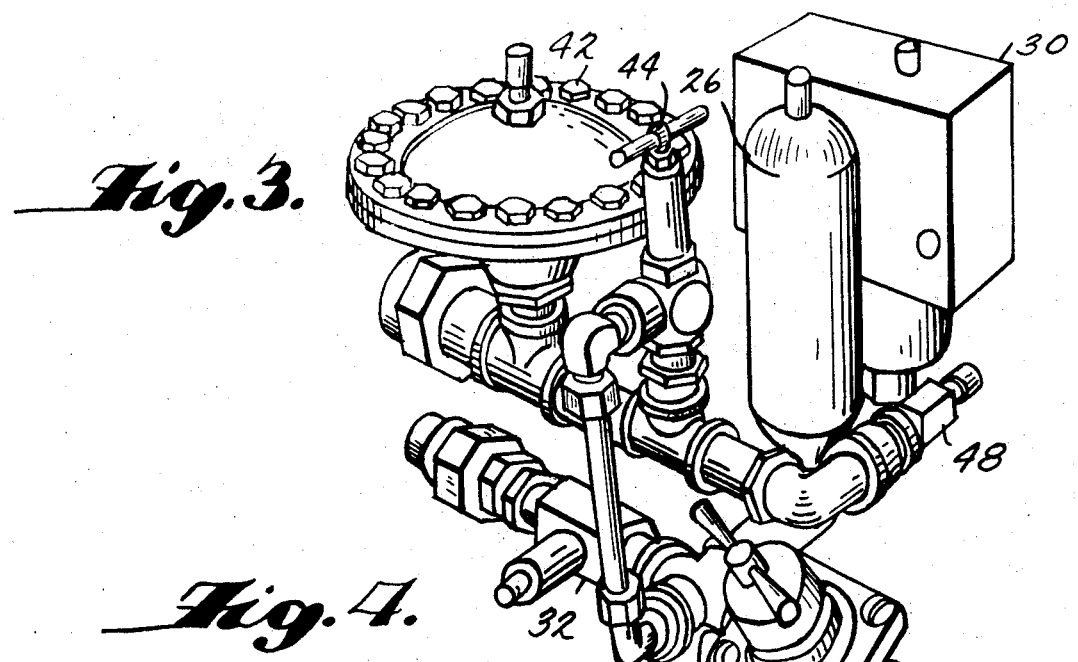
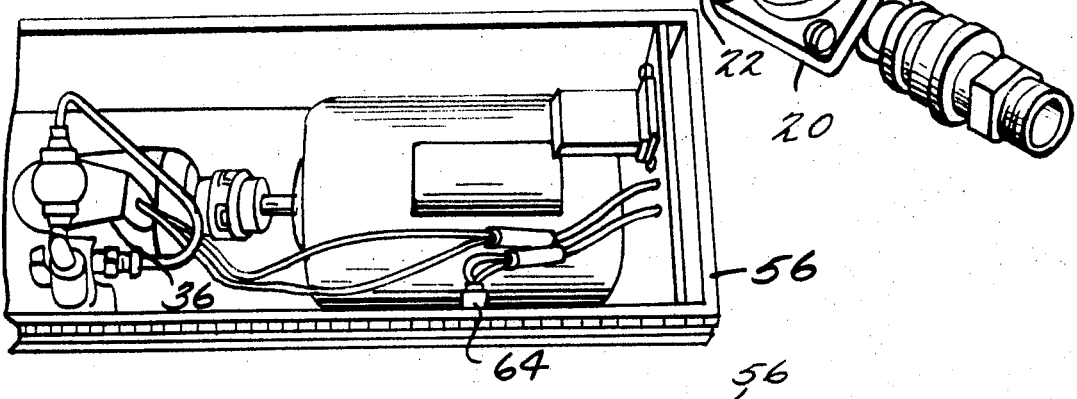
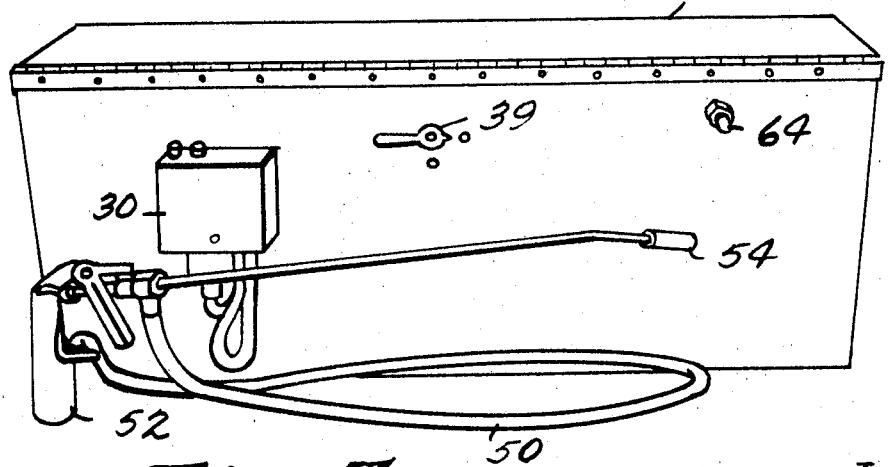

PRESSURE WASH CONTROL SYSTEM

This invention relates to a high velocity washing apparatus which is adapted to deliver a liquid against the surface to be cleaned. The apparatus has a simplified control which is adapted to stop and start the pump which controls the flow of liquid through the apparatus and at the same time also controls the flow of one or more additional selected chemicals into the flow of liquid. A mechanical control is used with the invention to allow the selection of additional chemicals which are used in connection with the primarily liquid flow for various purposes. When the output of the high pressure system is blocked or cut off, pressure is built up in the system and accordingly when the output is released or allowed to be discharged, there is a drop in back pressure within the system. The present invention utilizes this pressure differential to control the system.

The invention is adapted for the control of high velocity washers having a power driven pump, the outlet of which is connected by a flexible conduit to a spray head, the inlet of which has means for supplying liquid to it including a pressure regulator and means to supply at least a secondary chemical to the primary liquid flow. An example of a known pressure washer is described in the Techler U.S. Pat. No. 3,246,845, granted Apr. 19, 1966.

The present invention provides a pressure activated control for high pressure washing equipment so that the action of the high pressure fluid or fluids is utilized to operate the apparatus.

Other features and advantages of the invention will be apparent from the following description of the embodiments of the invention as shown in the accompanying drawings.

BRIEF DESCRIPTION OF THE DRAWINGS

FIG. 3 is a perspective view of the plumbing elements of the invention.

FIG. 4 is a partial top perspective view of the invention in its cabinet with the cabinet lid removed.

FIG. 5 is a side perspective view of the apparatus enclosed in the cabinet.

DETAILED DESCRIPTION OF THE DRAWINGS

Figure 1:
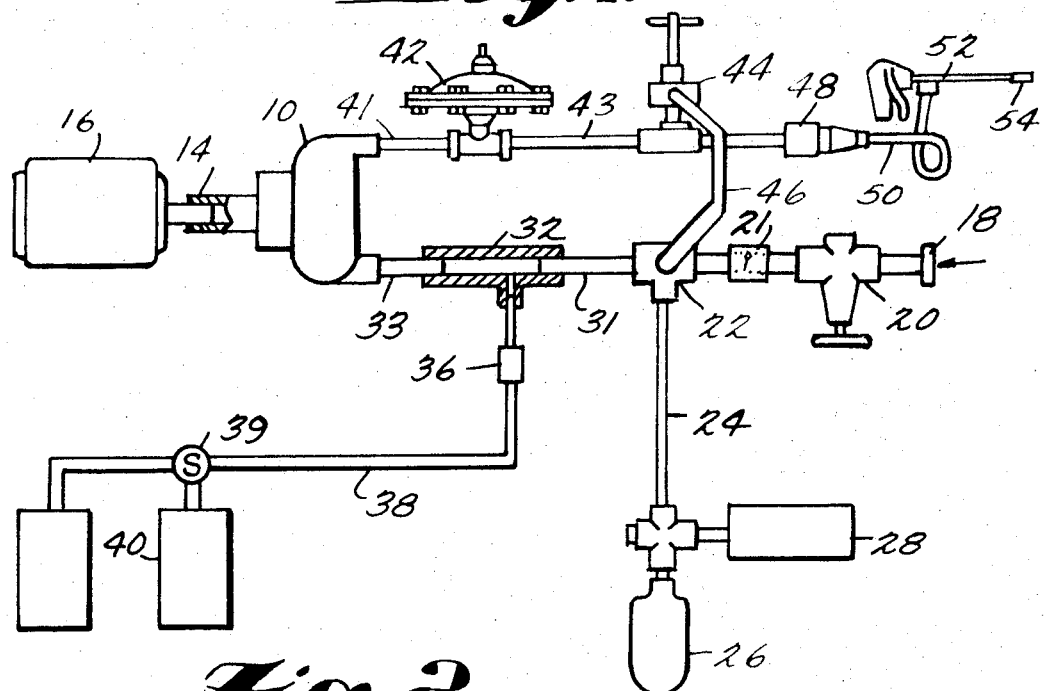
FIG. 1 is a schematic illustration of the flow system of the invention showing various elements of the system.

As shown in FIGS. 1 and 3, a pump 10 driven by a drive shaft 14, operated by motor 16, is adapted to be supplied with liquids through conduit means. The motor is connected to a source of power which is not shown. A typical pump that can be used with the invention is a 500 psi pump manufactured by Deloven, Model No. 20000A. However, any positive displacement pump can be used with the invention at any gallonage or at any pressure. A water inlet connection 18 on the conduit means is adapted to be connected to a source of water or any other liquid port. Ordinary tap water may be supplied to the inlet connection 18 by placing a standard garden hose connection on the inlet connection. It should be noted that the water inlet preferably is connected to a low pressure source of fluid. The fluid which is normally used in the invention is water or degreaser, however, the term water will be used throughout the following specification. The term water should not be construed as to be limiting the invention only to that fluid, as degreaser or other suitable fluids can be used. Water coming in through low pressure inlet 18 passes through a pressure regulator 20 which regulates the pressure of water passing through it. The regulator 20 which is of a standard make is preferably set to allow water under a pressure of 20 psi to pass therethrough. After the fluid has passed through the regulator at the set pressure, it is carried by a conduit into a fitting 22. The fitting 22 has one section secured to a conduit 24 to a shock suppressor 26 and pressure sensitive switch 28 so that water can flow from the fitting. The shock suppressor 26 or water hammer is preferably charged with 15 pounds of air. It should be noted that a one-way valve 21 is preferably placed between the pressure regulator 20 and fitting 22 to keep any high pressure flow from coming back into the regulator and damaging the regulator diaphragm. The pressure sensitive switch 28 is preferably contained in a switch box 30 as is shown in FIGS. 3 and 5 to protect it against damage. The pressure sensitive switch 28 works due to the fact that there is a pressure drop when the pump goes on and when the flow from the pump is blocked, the pressure rises, setting forth a clear range of pressure to operate the pressure sensitive switch. This will be described in greater detail later in the specification. In the preferred embodiment the highly sensitive pressure switch is pre-set to open the motor circuit at 19 psi and complete the motor circuit at 18 psi. The pressure sensitive switch is a switch that operates to turn the pump motor on and off. The switch is normally closed, but at pressures greater than 19 psi the switch is opened to break electrical contact. The pressure sensitive switch can have a one pound differential, but in the preferred embodiment a 1¾ pound differential is used. The other end of the fitting 22 is secured to conduit 31, which leads to a chemical injector 32. The chemical injector 32 can be of a venturi or aspirator type construction so that the primary fluid passing through it will deliver a secondary chemical or plurality of chemicals into the pump along with the water via coupler 33 in cooperation with the vacuum created by the pump. The injector 32 is connected to a plurality of chemical tanks 40 by a conduit 38. An electrical solenoid valve 36, controlled by the pressure sensitive switch 28 is disposed in the conduit 38 which leads to and is secured to the injector to control the flow of fluid through conduit 38. Depending upon the activation by the pressure sensitive switch, the solenoid valve is either open or closed. A mechanical four-way or three-way valve 39 serves to select the type of chemical being mixed with the water from tanks 40 depending upon which way the mechanical valve is set. By using the three-way valve or four-way valve, you can select one, two or three different chemicals to be added to the water in the system. In the mechanical valve 39, one position is preferably a deadhead, and will pick up no chemicals whatsoever, irregardless of whether the solenoid 36 opens or closes. The water or degreaser with additive chemical travels into the pump 10 where it is built up to 500 psi and is discharged through conduit 41 into a surge guard pulsation reducer 42 so that the flow will be constant.

The pulsation reducer 42, as the name indicates, dampens or suppresses the pulsation of the flow discharged from the pump, enabling a constant flow through the high pressure side of the system. The constant flow of the fluid travels through conduit 43 into and through a pressure relief valve means 44, which is connected to a bypass conduit 46, the bypass conduit 46 allowing the fluid to recirculate back to the low level side when there is a pressure backup. The pressure relief valve means 44 is preferably adjustable between 110 - 700 pounds and if desired, can be used in connection with an unloader valve. In another embodiment of the invention, a pressure bypass valve is substituted for the pressure relief valve means 44. The bypass 46 returns excessive pressure fluid into the system for recirculation when the high pressure outlet is shut off. In the preferred embodiment a four pound differential is obtained by releasing and shutting off the high pressure output. The fluid continues its flow through a high pressure quick disconnect coupling 48 or other suitable connection, which is adapted to be fitted to a hose 50, one end of which has a mating coupling which will fit over the quick disconnect coupling 48, the other end of which is connected to a spray gun 52, which preferably has a variable supply nozzle 54. The apparatus, as shown in FIGS. 4 and 5, is placed into a cabinet 56 with only the switch box 30 and quick disconnect coupling 48 extending outside the exterior of the cabinet. The spray gun and hose will sit outside of the cabinet 56 allowing flexibility in use of the hose and spray nozzle. When the spray gun 52 is shut off, the pressure backs up in the system and increases to the point where it could possibly damage the pump which is the reason the bypass conduit 46 is provided. When the gun is shut off, the pressure causes the fluid to enter the relief valve and opens it so that the fluid is recirculated through the bypass conduit activating the pressure sensitive switch 28. The time from when the spray gun 52 is shut off until switch 28 cuts off the motor 16 to the pump 10 is a short time in the range of 1 to several seconds.

FIG. 5 shows the cabinet 56 which contains the plumbing of the apparatus. The dimensions of the cabinet are preferably approximately 7 inches in width, 30 inches in length and 12 inches in height. A flip-top, hinged lid is secured to the top of the cabinet. The pump is positioned at one end of the cabinet and at that end the back compartment is louvred for ventilation of the motor. The cabinet can be made out of plexiglass, stainless steel, plastic or any other suitable material. The conduits are preferably satinless steel or copper with the couplings or fittings being constructed of brass. However, any other suitable material could be used.

Figure 2:
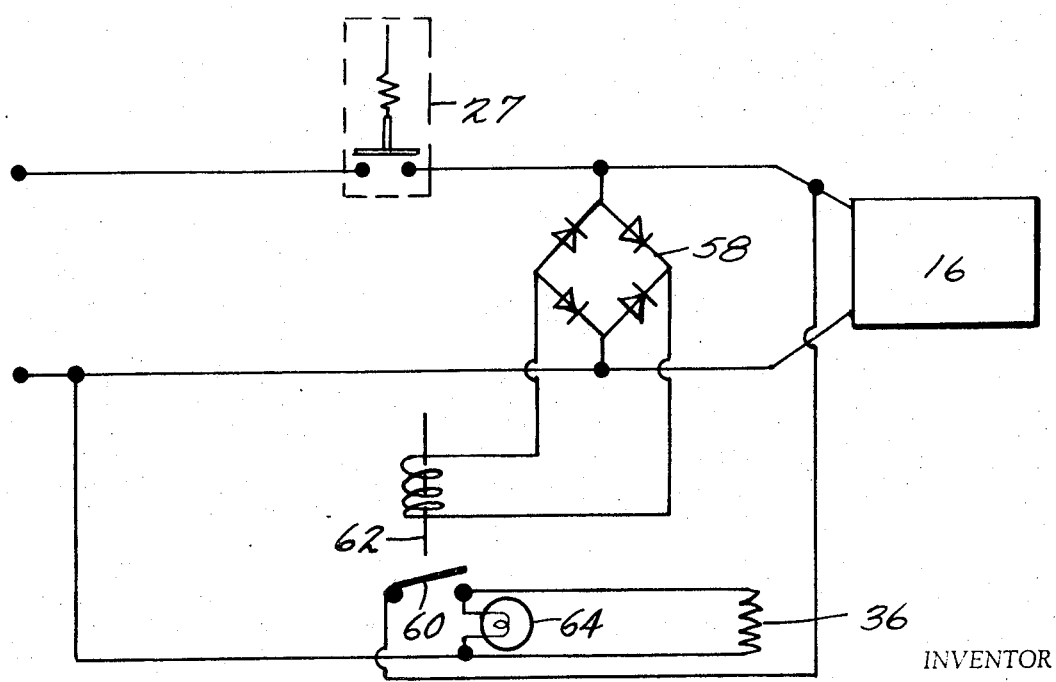
FIG. 2 is a schematic wiring diagram showing the control circuit of the system.

A circuit of the system when the apparatus is working at 20 psi is shown in FIG. 2. When pressure is released the pressure sensitive switch which is circuit 27 or apparatus 28 closes at 18 psi and when the outlet pressure is shut off causing a back up of pressure, the switch opens up at 19 psi cutting off the pump motor 16. When the spray gun 52 is shut off you have a 20 psi pressure back at the pressure sensitive switch. With the gun in the open position, there is a pressure drop of approximately 3½ pounds, using a 5.5 degree nozzle, which handles 2 gallons per minute at 500 psi. This pressure drop allows the pressure sensitive switch to function. When the pressure drops from 20 pounds to 18 pounds, this activates the switch causing the current to go through the motor and start the pump. When the pump is in operation, the pressure drops to 10 psi through the entire system behind the pump. The reason for this pressure drop is that the pump creates a vacum or suction. The regulator does not compensate for this pressure drop. In the closing or shutting off of the high pressure gun, the pressure regulator will then allow the incoming pressure to go on up to 20 pounds, and at 19 pounds, the pump will go off. At the particular moment the pump goes off, there is a back pressure feed which will build up to approximately 25 psi. That back feed can vary according to length of hose and diameter of hose, it can vary as high as up to 50 pounds. All pressure switches are preferably rated for 50 pounds or lower pressure. The pressure sensitive switch is preferably open so that when water enters the system at a specified pressure, the switch is closed completing the circuit to the full wave rectifier bridge 58 which closes switch 60 by energizing or de-energizing mechanical latching solenoid 62 depending on how switch 60 is set up. The system preferably uses 110 volt alternating current and converts it into direct current. This is accomplished by using a rectifier bridge which converts the AC to DC.

A light or acoustical signal 64 is connected to the circuitry so that the signal will show the solenoid is energized. At the same time the pump is operating solenoid valve 36 is energized, opening the conduit 38 leading to the chemical tanks 40 so that chemicals or a chemical are supplied to the injector valve 32. Chemicals will then be aspirated into the injector valve 32 depending on the mechanical setting of valve 39. If the valve is set on the deadhead, only water, degreaser or the fluid passing through inlet 18 will be passed through the system. If the valve is directed to open towards any of the respective chemical tanks 40, that chemical or chemicals will pass into the system through injector 32. Only in alternative cycles will the solenoid 36 be energized. In operation of the system, the switching is envisioned as working off either the high pressure side or the low pressure side of the system. If desired the signal light could be placed on a pole or extension so that it would be visible over a greater distance.

The primary function of the above-mentioned apparatus is to enable an operator to selectively determine the type of fluid which is to be discharged upon the washing surface at a remote distance from the pump solely by the utilization of fluid pressure within the system. This function utilizes the alternative activation of the solenoid 36 by the previously mentioned continuous duty mechanical latching relay 60 in that the solenoid of the apparatus is on an "on" or "off" position. After discharging the water through the nozzle, the operator can stop the fluid flow by shutting off the gun 52. Upon activation of the fluid flow, the solenoid assumes an alternate position from the initial position which is occupied. Assuming that it is now in an open position, it will allow an additional chemical to be placed into the water stream. When it is shut off and again activated, the solenoid assumes the alternate position which in this case would be the "off" position.

Thus, by starting and stopping the fluid discharge, the selection of chemicals or of a chemical to be placed on the washing surface can be achieved at a remote distance from the pump apparatus. The pump is permanently shut off by closing the gun handle and activated again by opening the gun handle.

While the preferred embodiment of the invention has been disclosed, it is understood that the invention is not

What is claimed is:

1. A pressure washer comprising a motor driven pump having a fluid receiving inlet connected to a low pressure fluid directing means and a fluid discharge outlet connected to high pressure fluid discharge means and control means connected to said low pressure fluid direction means, said low pressure fluid directing means comprising conduit means mounted to said pump, a pressure regulator mounted to said conduit means; said pressure regulator serving to regulate fluid pressure passing through said conduit means; and a chemical injector means mounted to said conduit means; said injector means comprising a venturi unit mounted to said conduit means, said venturi having a suction port, a second conduit means connected to said venturi and at least one chemical reservoir, selection valve means mounted in said second conduit means, said second conduit means having one end connected to said venturi adjacent said suction port and the other end connected to at least one reservoir so that each reservoir can selectively communicate with said first conduit means; said high pressure fluid discharge means comprising a third conduit means mounted to said pump; a bypass valve means mounted on said third conduit means; a bypass conduit having one end secured to said bypass valve means and the other end secured to said first conduit means; said bypass conduit allowing fluid from said third conduit means to flow into said first conduit means for recirculation when said fluid is at a predetermined pressure; and discharge nozzle means connected to said third conduit means, said control means being adapted to run and stop said pump and control the chemical flow from said injector means and comprising a circuit means, a latch relay connected to said circuit means and a pressure operated electric switch connected to said first conduit means and adapted to switch from an open contact position to a closed contact position when there is a pressure change in said first conduit means, said pressure switch being electrically connected by said circuit means to said pump motor and said selection valve means and adapted to activate said pump motor when said discharge nozzle is activated so that the water in the system flows causing a pressure drop closing the latch relay to alternate the position of said selection valve and to deactivate said pump motor when there is an increase in pressure caused by the deactivation of said discharge nozzle.

2. A pressure washer as claimed in claim 1, wherein said control means has a shock suppressor mounted thereto; said shock suppressor being positioned so that fluid passing from said first conduit means will first enter said shock suppressor.

3. A pressure washer as claimed in claim 1, wherein said first conduit means has a one-way check valve allowing fluid to pass through said regulator into said first conduit means while preventing fluid carried by the bypass conduit from flowing into said regulator.

4. A pressure washer comprising a motor driven pump having an inlet and an outlet, a first conduit means adapted to connect said inlet means to a source of fluid, a regulator secured to said first conduit means to regulate the pressure of fluid passing therethrough, a fixture secured to said conduit means; said fixture being adapted to direct fluid from said regulator toward said pump inlet and along a pressure sensitive switch conduit connected thereto, said pressure sensitive switch conduit having a shock suppressor and a pressure sensitive switch mounted thereon; said pressure sensitive switch being connected to circuit means leading to said pump motor and a solenoid valve means, said fixture also being connected to a bypass conduit and being adapted to receive fluid from said bypass conduit for recirculation through said first conduit means; injector means mounted to said first conduit means between said fixture and said pump inlet; said injector means comprising an aspirator apparatus, a fluid supply conduit connected to said aspirator apparatus; said fluid supply conduit also being connected to at least one chemical reservoir; solenoid valve means mounted in said supply conduit; said solenoid valve means being selectively opened and closed by said pressure sensitive switch contacting said circuit means to allow the flow of chemicals from each said chemical reservoir through said supply conduit into said injector means, a second conduit means secured to said pump outlet; a bypass valve fixture is mounted to said second conduit means; said bypass valve fixture being secured to said bypass conduit; a suppressor is mounted to said second conduit means between said bypass valve fixture and said pump outlet to control the flow of fluid discharged from said pump outlet and discharge means is secured to the end of said second conduit means, said discharge means comprising a hose having one end adapted to be mounted to said second conduit means and the other end connected to spray gun having a nozzle discharge means, the discharge means of said spray gun causing a pressure drop in said switch conduit which activates said pressure switch to start the pump motor and operate the solenoid valve means.

* * * * *